(12) United States Patent
Makita et al.

(10) Patent No.: US 10,173,859 B2
(45) Date of Patent: Jan. 8, 2019

(54) RECORDING-MEDIUM BINDING DEVICE

(71) Applicant: FUJI XEROX CO., LTD., Tokyo (JP)

(72) Inventors: Takuya Makita, Kanagawa (JP);
Hiroaki Awano, Kanagawa (JP);
Yoshinori Nakano, Kanagawa (JP);
Kojiro Tsutsumi, Kanagawa (JP);
Katsumi Harada, Kanagawa (JP);
Toshiyasu Yukawa, Kanagawa (JP);
Junichi Hirota, Kanagawa (JP);
Yasuhiro Kusumoto, Kanagawa (JP);
Hiroshi Hagiwara, Kanagawa (JP);
Emiko Shiraishi, Kanagawa (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 0 days.

(21) Appl. No.: 15/469,638

(22) Filed: Mar. 27, 2017

(65) Prior Publication Data

US 2017/0283206 A1 Oct. 5, 2017

(30) Foreign Application Priority Data

Mar. 29, 2016 (JP) .................................. 2016-066533
Oct. 21, 2016 (JP) .................................. 2016-206526

(51) Int. Cl.
*B31F 5/02* (2006.01)
*B65H 37/04* (2006.01)
(Continued)

(52) U.S. Cl.
CPC ......... *B65H 37/04* (2013.01); *G03G 15/6544* (2013.01); *G11B 7/24024* (2013.01);
(Continued)

(58) Field of Classification Search
CPC ...... B31F 1/07; B31F 5/02; B31F 2201/0712; G03G 15/6541; G03G 2215/00852; B65H 2301/43828; B65H 2301/51616
(Continued)

(56) References Cited

U.S. PATENT DOCUMENTS 6,458,447 B1 * 10/2002 Cabell ..................... B29C 55/18
162/109
7,229,681 B2 * 6/2007 Boegli ................. B29C 59/022
101/23
(Continued)

FOREIGN PATENT DOCUMENTS

EP           2180994 B1 *  5/2016
JP      2004-155537 A  *  6/2004
(Continued)

*Primary Examiner* — Leslie A Nicholson, III
(74) *Attorney, Agent, or Firm* — Sughrue Mion, PLLC

(57) ABSTRACT

A recording-medium binding device includes first and second tooth groups. The first tooth group includes first and second tooth rows. The second tooth group includes third and fourth tooth rows. The third tooth row to be engaged with the first tooth row forms, together with the first tooth row, a first tooth row pair. The fourth tooth row to be engaged with the second tooth row forms, together with the second tooth row, a second tooth row pair. A second engaging height in the second tooth row pair is smaller than a first engaging height in the first tooth row pair. A second effective tooth top width in the second tooth row pair is larger than a first effective tooth top width in the first tooth row pair.

12 Claims, 5 Drawing Sheets

(51) Int. Cl.
*G11B 7/24024* (2013.01)
*G11B 7/256* (2006.01)
*G03G 15/00* (2006.01)

(52) U.S. Cl.
CPC .... *G11B 7/256* (2013.01); *B65H 2301/51616* (2013.01); *B65H 2801/27* (2013.01)

(58) Field of Classification Search
USPC ........................................ 270/58.08; 493/390
See application file for complete search history.

(56) References Cited

U.S. PATENT DOCUMENTS

| | | | | |
|---|---|---|---|---|
| 8,333,372 | B2 * | 12/2012 | Awaya | B65H 37/04 |
| | | | | 270/58.07 |
| 8,596,633 | B2 * | 12/2013 | Awaya | B65H 37/04 |
| | | | | 270/58.07 |
| 8,973,267 | B2 * | 3/2015 | Gelli | B23C 3/32 |
| | | | | 29/895.3 |
| 2016/0107409 | A1 | 4/2016 | Kubo | |

FOREIGN PATENT DOCUMENTS

| | | | |
|---|---|---|---|
| JP | 2010-274623 A | * | 12/2010 |
| JP | 2016-79000 A | | 5/2016 |

\* cited by examiner

RECORDING-MEDIUM BINDING DEVICE

CROSS-REFERENCE TO RELATED APPLICATIONS

This application is based on and claims priority under 35 USC 119 from Japanese Patent Application Nos. 2016-066533 filed Mar. 29, 2016 and 2016-206526 filed Oct. 21, 2016.

BACKGROUND

(i) Technical Field

The present invention relates to a recording-medium binding device.

(ii) Related Art

With a known recording-medium binding device, stacked plural recording media are subjected to pressure by pinching the recording media with a pair of tooth rows engaged with each other, so that the recording media are deformed into a waveform shape so as to be combined with one another. With such a recording-medium binding device, there exists an appropriate engaging height of teeth of mutually engaged tooth rows in accordance with the thickness of a batch of recording media. In the case of a thin batch of recording media, it is possible to deform the recording media into a waveform shape with a small engaging height of teeth. However, when it is attempted to bind a thick batch of recording media to one another with tooth rows of a small engaging height, in some cases it is not possible to deform the recording media sufficiently to combine the recording media with one another. In the case of a thick batch of recording media, it is possible to bind the recording media to one another with tooth rows of a large engaging height. In contrast, when it is attempted to bind a thin batch of recording media to one another with tooth rows of a large engaging height, in some cases the recording media are broken. In this case, the recording media are not combined with one another.

SUMMARY

According to an aspect of the present invention, a recording-medium binding device includes a first tooth group and a second tooth group. The first tooth group includes a first tooth row and a second tooth row. The first tooth row includes plural teeth arranged in a tooth arrangement direction. The second tooth row includes plural teeth arranged in a tooth arrangement direction and is disposed adjacent to the first tooth row in a tooth width direction. The second tooth group includes a third tooth row and a fourth tooth row. The third tooth row includes plural teeth arranged in a tooth arrangement direction, is to be engaged with the first tooth row, and forms, together with the first tooth row, a first tooth row pair. The fourth tooth row includes plural teeth arranged in a tooth arrangement direction, is to be engaged with the second tooth row, and forms, together with the second tooth row, a second tooth row pair. The second tooth group cooperates with the first tooth group so as to pinch a batch of recording media to bind the recording media. In the first tooth row pair, an engaging height is a first engaging height and a width of an effective tooth top is a first effective tooth top width. In the second tooth row pair, the engaging height is a second engaging height that is smaller than the first engaging height and a width of an effective tooth top is a second effective tooth top width that is larger than the first effective tooth top width.

BRIEF DESCRIPTION OF THE DRAWINGS

Exemplary embodiment of the present invention will be described in detail based on the following figures, wherein.

DETAILED DESCRIPTION

Figure 1:
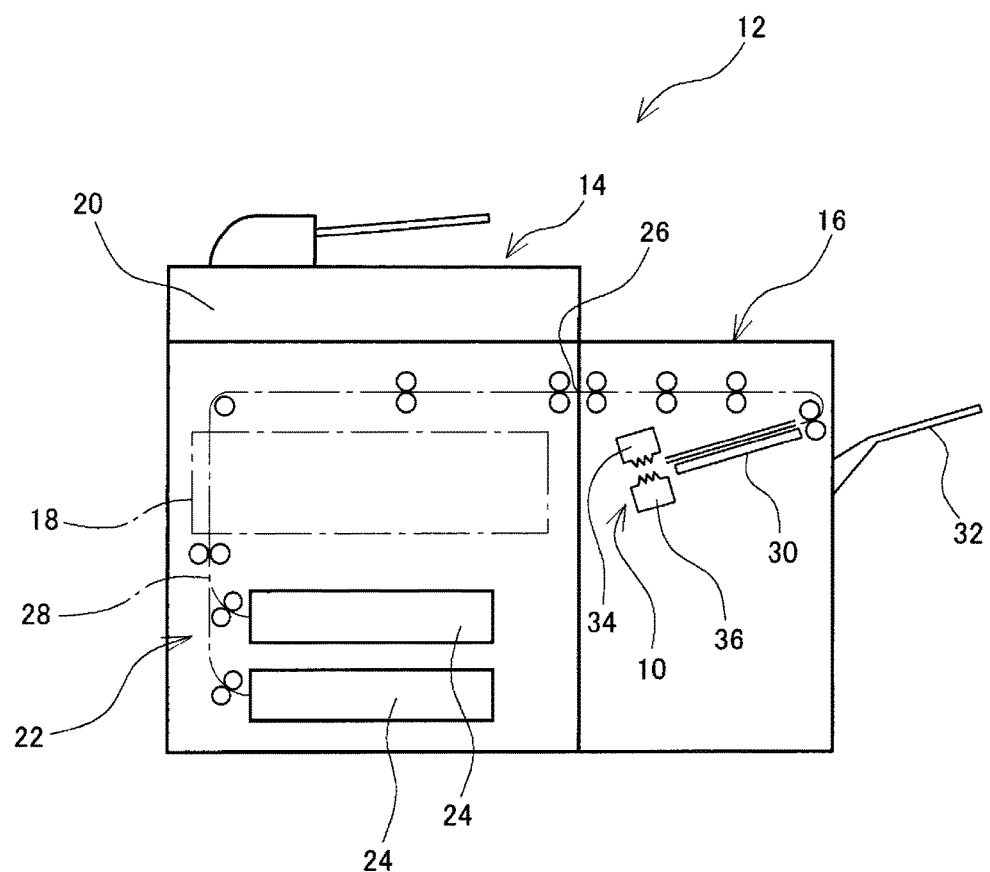
FIG. 1 schematically illustrates the structure of an image forming system.

An exemplary embodiment of the present invention will be described below with reference to the drawings. FIG. 1 is a schematic diagram of the structure of an image forming system 12 that includes a recording-medium binding device 10 according to the present exemplary embodiment. The image forming system 12 includes an image forming apparatus 14 and a recording-medium post processing apparatus 16. The image forming apparatus 14 has functions such as, for example, electrophotographic printing and copying functions. The recording-medium post processing apparatus 16 performs post processes such as, for example, punching and binding on recording media on which images have been formed by the image forming apparatus 14. The recording-medium binding device 10 according to the present exemplary embodiment is mountable in the recording-medium post processing apparatus 16.

The image forming apparatus 14 includes an image forming section 18 that forms toner images in accordance with obtained document information. The document information may be obtained by reading a document with a document reader 20 included in the image forming apparatus 14 or obtained from an external device. The image forming apparatus 14 further includes a recording-medium feeding mechanism 22. The recording media to be fed are sheet-shaped recording media having been cut into rectangular shapes made of, for example, paper. The recording-medium feeding mechanism 22 includes feed trays 24 and a transport path 28. The feed trays 24 hold the recording media stacked thereon. The transport path 28 allows the recording media to be fed therethrough from the feed trays 24 to an output opening 26. The toner images having been formed by the image forming section 18 is received by and fixed onto the recording media while the recording media are transported through the transport path 28. The recording media having been output through the output opening 26 are received by the recording-medium post processing apparatus 16.

The recording media received by the recording-medium post processing apparatus 16 are accumulated on an accumulation tray 30 according to need so as to form a batch of recording media. In the case where the accumulation is not required, the recording media are fed to an output tray 32. When a predetermined number of recording media are accumulated on the accumulation tray 30, the recording media are bind by the recording-medium binding device 10. The recording-medium binding device 10 includes two tooth groups 34 and 36 that are paired with each other. Each of the tooth groups 34 and 36 includes plural teeth arranged therein. For convenience of distinguishing between two tooth groups, the tooth groups illustrated on the upper and lower sides of FIG. 1 are respectively referred to as the upper tooth group 34 and the lower tooth group 36. It is sufficient that two tooth groups 34 and 36 face each other with the recording media to be bound pinched therebetween. For example, the tooth groups 34 and 36 are respectively arranged on the left and right, or the upper tooth group 34 and the lower tooth group 36 are respectively disposed on the lower and upper sides.

One or both of the upper tooth group 34 and the lower tooth group 36 are advanced toward and retracted from the other or each other by a drive mechanism. When one or both of the upper tooth group 34 and the lower tooth group 36 are advanced, the upper tooth group 34 and the lower tooth group 36 are engaged with each other. When the tooth groups are engaged with each other, the recording media pinched therebetween are deformed into a wave shape, combined with one another, and bound to one another. The batch of recording media having been bound is fed to the output tray 32.

Figure 2A:
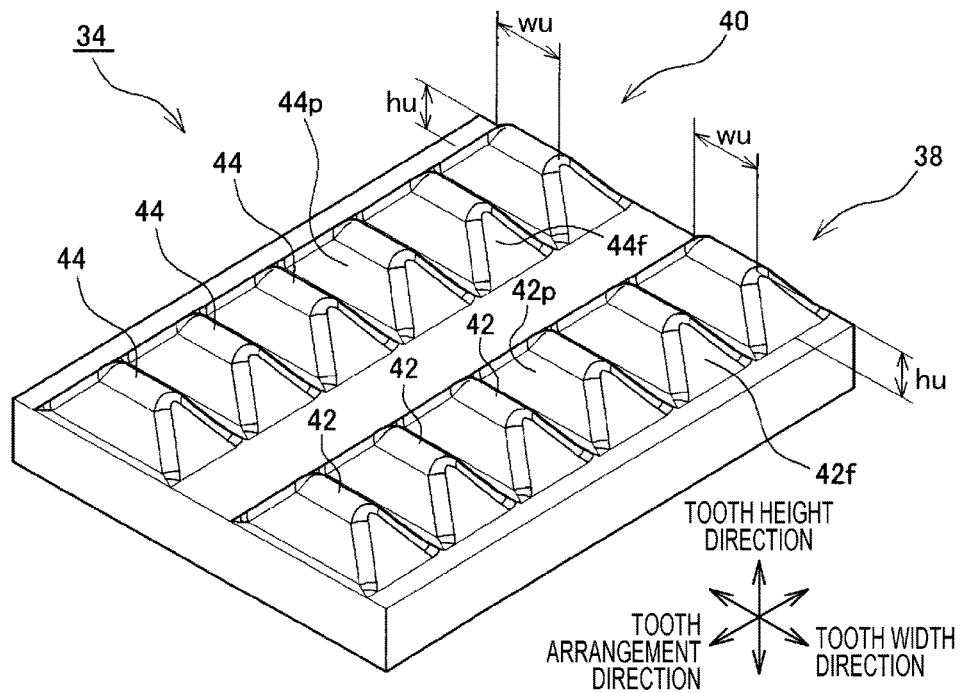
FIGS. 2A and 2B are respectively perspective views of an upper tooth group and a lower tooth group of a recording-medium binding device according to an exemplary embodiment.
Figure 2B:
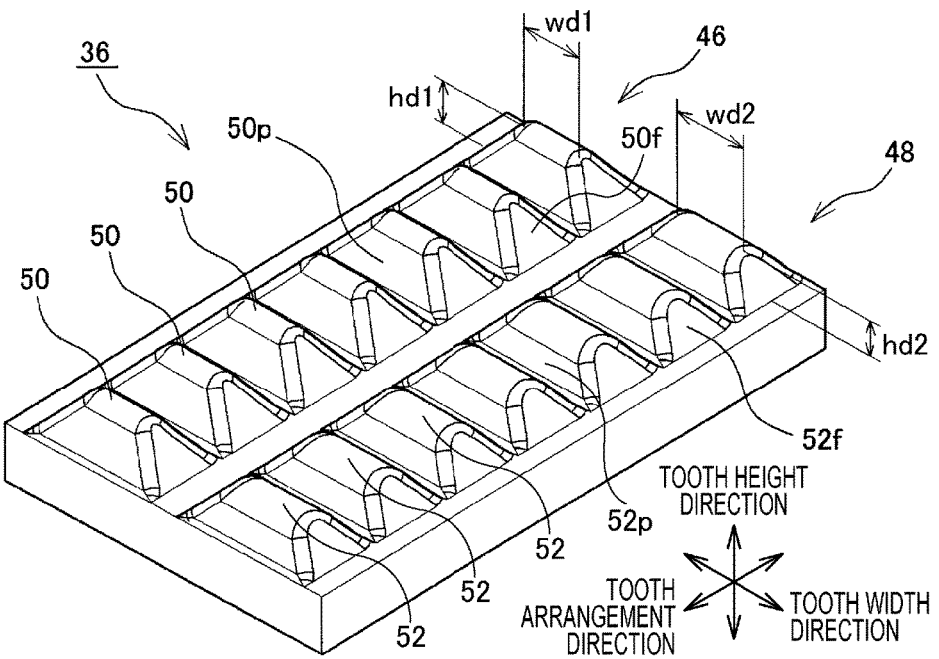

FIGS. 2A and 2B are perspective views respectively illustrating the upper tooth group 34 and the lower tooth group 36. FIG. 2A illustrates the upper tooth group 34. The upper tooth group 34 includes two tooth rows 38 and 40. One of two tooth rows is referred to as the first tooth row 38 and the other tooth row 40 is referred to as the second tooth row 40. The first tooth row 38 includes plural, for example, six teeth 42 arranged therein. These teeth 42 are referred to as first upper teeth 42. A direction in which the first upper teeth 42 are arranged is referred to as a "tooth arrangement direction", a direction of the height of the first upper teeth 42 is referred to as a "tooth height direction", and a direction perpendicular to the tooth arrangement direction and the tooth height direction is referred to as a "tooth width direction". The first upper teeth 42 have the same height hu and the same tooth top width wu. The second tooth row 40 includes plural teeth 44 arranged therein. The number of the teeth 44 is, for example, the same as the number of the teeth in the first tooth row 38. These teeth 44 are referred to as the second upper teeth 44. The second tooth row 40 is adjacent to the first tooth row 38 in the tooth width direction. The second upper teeth 44 may be arranged in the same direction as the tooth arrangement direction of the first tooth row 38, so that the first tooth row 38 is disposed parallel to the second tooth row 40. The second upper teeth 44 have the same tooth height hu and the same tooth top width wu as those of the first upper teeth 42. Both ends of the first tooth row 38 may be aligned with ends of the second tooth row 40 in the tooth arrangement direction. Alternatively, the number of the teeth in the first tooth row 38 may be different from the number of the teeth in the second tooth row 40.

FIG. 2B illustrates the lower tooth group 36. The lower tooth group 36 includes a third tooth row 46 that faces the first tooth row 38 and a fourth tooth row 48 that faces the second tooth row 40. The third tooth row 46 includes plural teeth 50 arranged therein. The number of the teeth 50 of the third tooth row 46 is, for example, more than the number of the first upper teeth 42 by one. These teeth 50 are referred to as the lower high teeth 50. The lower high teeth 50 are arranged, for example, in the same direction as the tooth arrangement direction of the first tooth row 38 and have the same tooth height hd1 as the tooth height hu of the first and second upper teeth 42 and 44. Furthermore, a tooth top width wd1 is equal to the tooth top width wu of the first and second upper teeth 42 and 44 or larger. The fourth tooth row 48 includes plural teeth 52 arranged therein. The number of the teeth 52 is, for example, more than the number of the second upper teeth 44 by one. These teeth 52 are referred to as the lower low teeth 52. The fourth tooth row 48 is adjacent to the third tooth row 46 in the tooth width direction. The lower low teeth 52 may be arranged in the same direction as the tooth arrangement direction of the third tooth row 46, so that the third tooth row 46 and the fourth tooth row 48 are disposed in parallel. A tooth height hd2 of the lower low teeth 52 is smaller than the tooth height hd1 of the lower high teeth 50. A tooth top width wd2 of the lower low teeth 52 is larger than the tooth top width wd1 of the teeth 50 of the third tooth row 46. Both ends of the third tooth row 46 may be aligned with ends of the fourth tooth row 48 in the tooth arrangement direction. The number of the teeth of the third tooth row 46 may be different from that of the fourth tooth row 48.

Figure 3A:
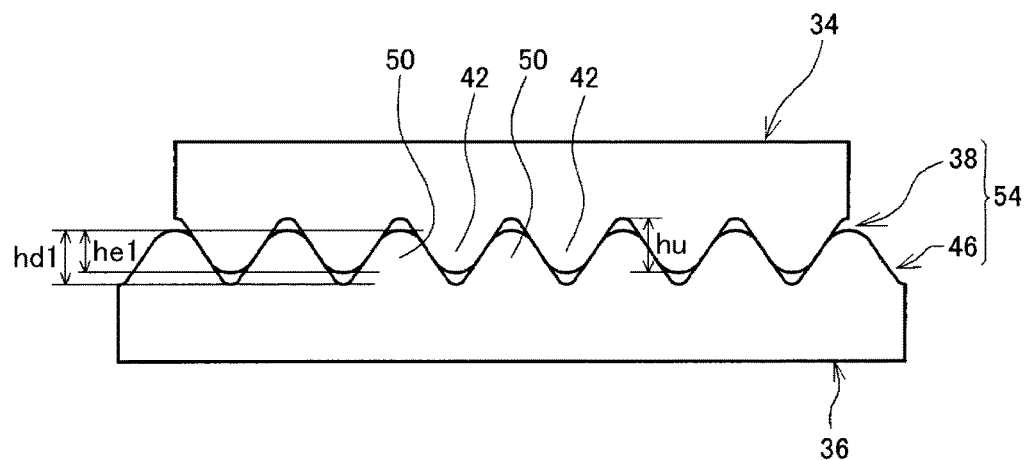
FIGS. 3A and 3B are sectional views of the upper tooth group and the lower tooth group in engagement with each other.
Figure 3B:
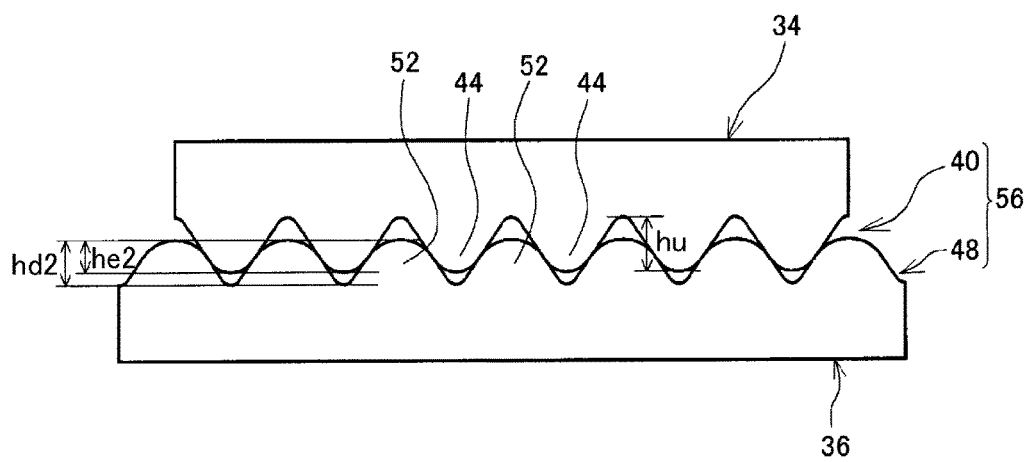

FIGS. 3A and 3B are sectional views of the upper tooth group 34 and the lower tooth group 36 in engagement with each other. Out of FIGS. 3A and 3B, FIG. 3A illustrates a section of the first tooth row 38 and the third tooth row 46 perpendicular to the tooth width direction. FIG. 3B illustrates a section of the second tooth row 40 and the fourth tooth row 48 perpendicular to the tooth width direction. The first tooth row 38 and the third tooth row 46 are engaged with each other. These tooth rows paired with each other are referred to as a high tooth row pair 54. The second tooth row 40 and the fourth tooth row 48 are engaged with each other. These tooth rows paired with each other are referred to as a low tooth row pair 56.

Figure 4:
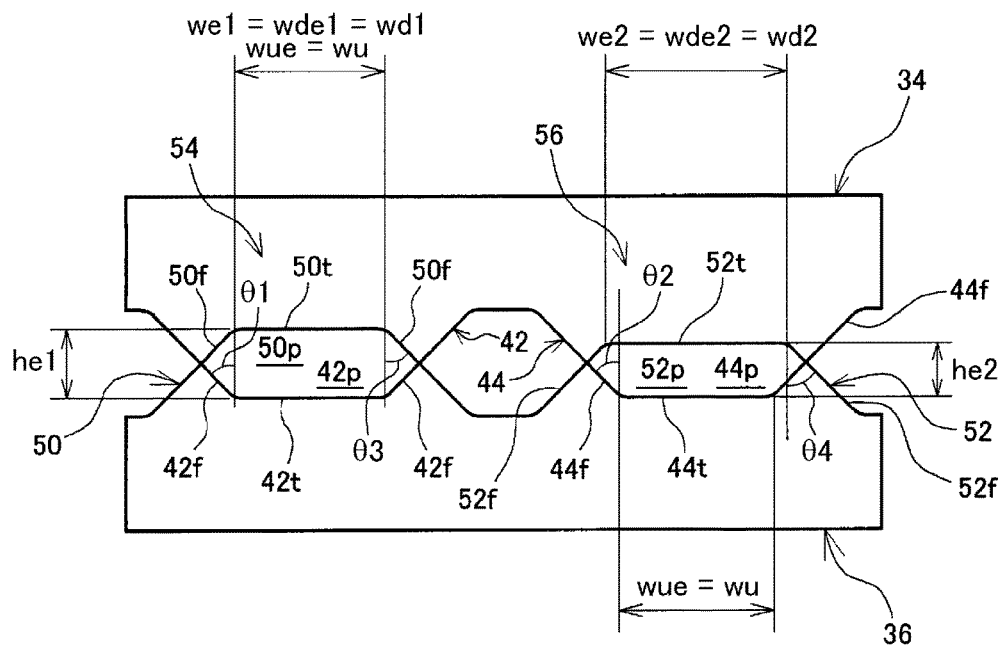
FIG. 4 illustrates the upper tooth group and the lower tooth group seen in a tooth arrangement direction.

FIG. 4 illustrates the upper tooth group 34 and the lower tooth group 36 in engagement with each other when seen in the tooth arrangement direction. In FIG. 4, the upper tooth group 34 and the lower tooth group 36 are superposed on each other. Although corners formed between a tooth top 42$t$ and tooth side surfaces 42$f$ of each of the first upper teeth 42 are rounded, the tooth top width wu is defined as the length of the tooth top 42$t$ while it is assumed that the corners are not rounded. That is, lines that pass through the left and right tooth side surfaces 42$f$ and the tooth top 42$t$ are assumed, and the distance between intersections of the assumed lines in the tooth width direction is defined as the tooth top width wu. Likewise, the tooth top widths wu, wd1, and wd2 are defined as the lengths of tooth tops 44$t$, 50$t$, and 52$t$ while it is assumed that the corners are not rounded in the teeth 44, 50, and 52. Each of the teeth 42, each of the teeth 44, each of the teeth 50, and each of the teeth 52 have, for example, respective isosceles trapezoidal shapes when seen in the tooth arrangement direction. Central positions of the tooth top 42$t$ of the first upper tooth 42 and the tooth top 50$t$ of the lower high tooth 50 are aligned with each other in the tooth width direction. Also, central positions of the tooth top 44$t$ of the second upper tooth 44 and the tooth top 52$t$ of the lower low tooth 52 are aligned with each other in the tooth width direction. Each of two tooth side surfaces 50$f$ of the lower high tooth 50 is inclined at an inclination angle θ3 relative to the tooth height direction, and each of two tooth side surfaces 52$f$ of the lower low tooth 52 is inclined at an inclination angle θ4 relative to the tooth height direction. Each of two tooth side surfaces 42$f$ of the first upper tooth 42 and each of two tooth side surfaces 44$f$ of the second upper tooth 44 are inclined at inclination angles θ1 and θ2 relative to the tooth height direction. All of four inclination angles θ1, θ2, θ3, and θ4 may be equal to one another, or some of four inclination angles θ1, θ2, θ3, and θ4 may be equal to one another. For example, the relationships of four inclination angles θ1, θ2, θ3, and θ4 may be as follows: the inclination angle θ1 and the inclination angle θ2 are equal to each other and the inclination angle θ3 and the inclination angle θ4 are equal to each other.

The tooth top 50t of the lower high tooth 50 and the tooth top 52t of the lower low teeth 52 are disposed within tooth surfaces 42p and 44P of the first and second upper teeth 42 and 44. That is, the tooth tops 50t and 52t are disposed inside the left and right tooth side surfaces 42f and 44f of the first and second upper teeth 42 and 44. In such a case, the entirety of the tooth top width wd1 and the entirety of the tooth top width wd2 contribute to combining of the recording media. That is, when the upper tooth group 34 and the lower tooth group 36 are brought into engagement with each other, the recording media are pressed into spaces between the first and second upper teeth 42 and 44 and pressed against tooth surfaces 42p and 44p of the first and second upper teeth 42 and 44 by the tooth tops 50t and 52t. This causes the recording media to be combined with one another. Accordingly, in the lower high teeth 50, a tooth top length wde1 contributing to the combining of the recording media agrees with the tooth top width wd1. Also, in the lower low teeth 52, a tooth top length wde2 contributing to the combining of the recording media agrees with the tooth top width wd2.

Figure 5:
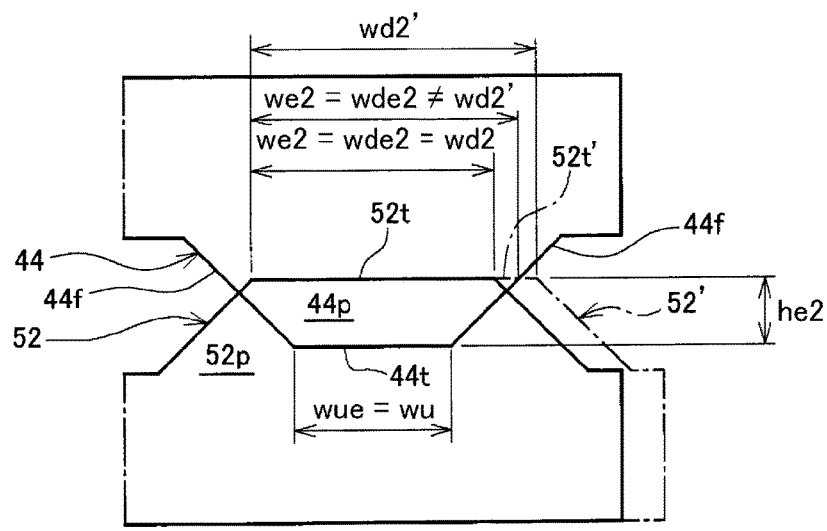
FIG. 5 illustrates an example in which a tooth top of one of teeth in engagement extends beyond a tooth side surface of the other tooth in engagement.

In contrast, as is the case with a lower low tooth 52' illustrated by a dotted-chain line in FIG. 5, when a tooth top 52t' extends beyond the tooth surface 44p of the second upper teeth 44, part of the tooth top 52t' beyond the tooth surface 44p does not contribute to the combining of the recording media. Accordingly, in this case, the tooth top length wde2 contributing to the combining of the recording media is smaller than a tooth top width wd2'.

Referring again to FIG. 4, the tooth tops 42t and 44t of the first and second upper teeth 42 and 44 are also disposed within the tooth surfaces 50p and 52p of the lower high tooth 50 and the lower low tooth 52, and accordingly, a tooth top lengths wue contributing to the combining of the recording media agree with the tooth top widths wu.

In each of the high tooth row pair 54 and the low tooth row pair 56, the tooth top length that influences more for combining the recording media is a larger tooth top length. The tooth top length that is larger out of the tooth top lengths of the teeth in engagement contributing to the combining of the recording media is referred to as an "effective tooth top width we" and the tooth top having the effective tooth top width we is referred to as an "effective tooth top". That is, in the high tooth row pair 54, the tooth top length wde1 of the lower high teeth 50 contributing to the combining of the recording media is equal to or larger than the tooth top length wue of the first upper teeth 42 contributing to the combining of the recording media, and the tooth top length wde1 is referred to as a high-tooth-row-pair effective tooth top width we1. In the low tooth row pair 56, the longer tooth top length wde2 contributing to the combining of the recording media is a low-tooth-row-pair effective tooth top width we2. As in the example illustrated in FIG. 5 by the dotted-chain line, when the tooth top extends beyond the tooth side surface of a target tooth for engagement, the effective tooth top width is determined in a range within the tooth surface of the target tooth.

In addition to the above-described dimensions in the tooth width direction, dimensions in the tooth height direction also contribute to combining forces for combining the recording media with one another. A dimension by which the teeth engaged with each other are superposed on each other in the tooth height direction is defined as an engaging height he. A high-tooth-row-pair engaging height he1 being an engaging height of the high tooth row pair 54 is the distance between the tooth top 42t of the first upper teeth 42 and the tooth top 50t of the lower high tooth 50 when the first upper teeth 42 and the lower high tooth 50 are engaged with each other. Furthermore, a low-tooth-row-pair engaging height he2 of the low tooth row pair 56 is the distance between the tooth top 44t of the second upper teeth 44 and the tooth top 52t of the lower low tooth 52 when the second upper teeth 44 and the lower low tooth 52 are engaged with each other.

The present recording-medium binding device 10 includes the high tooth row pair 54 and the low tooth row pair 56. Engaging heights of the high tooth row pair 54 and the low tooth row pair 56 are different from each other. The high tooth row pair 54 corresponds to a thick batch of recording media and the low tooth row pair 56 corresponds to a thin batch of recording media. The thickness of the batch of recording media is determined by the number of recording media and the thickness of each of the recording media included in the batch. For example, when the thickness of each of the recording media included in batches of recording media are the same, the thickness of a batch of recording media that includes a larger number of the recording media is larger, and when the numbers of the recording media included in batches of recording media are the same, the thickness of a batch of recording media that includes the recording media the thickness of each of which is larger is larger.

When the batch of recording media is thin, most of the combining of the recording media is achieved with the low tooth row pair 56. The recording media are pressed into the spaces (tooth grooves) between the second upper teeth 44 to be engaged with the lower low teeth 52 by the tooth tops 52t of the lower low teeth 52. This causes the recording media to be combined with one another and bound to one another. In the high tooth row pair 54, the recording media may be largely deformed and broken due to the large tooth height of the lower high teeth 50. When the recording media are broken, combining of the recording media is not expected at the broken portion. Thus, when the batch of recording media is thin, most of the combining is achieved with the low tooth row pair 56. In contrast, when the batch of recording media is thicker, in the low tooth row pair 56, the recording media are not sufficiently pressed into the tooth grooves between the teeth with which the lower low teeth 52 are to be engaged. Thus, the combining forces for combining the recording media with one another are insufficient. In the high tooth row pair 54, the tooth tops 50t of the lower high teeth 50 more deeply press the recording media into the tooth grooves between the first upper teeth 42. This increases the combining forces.

The combining forces of the recording media increase as the engaging height he increases and the effective tooth top width we increases. When the effective tooth top widths we of the high tooth row pair 54 and the low tooth row pair 56 are the same, the combining forces for combining a thin batch of recording media decrease because the low-tooth-row-pair engaging height he2 is smaller than the high-tooth-row-pair engaging height he1. In order to increase the combining forces in the low tooth row pair 56, the low-tooth-row-pair effective tooth top width we2 is made to be larger than the high-tooth-row-pair effective tooth top width we1 in the present recording-medium binding device 10.

Figure 6:
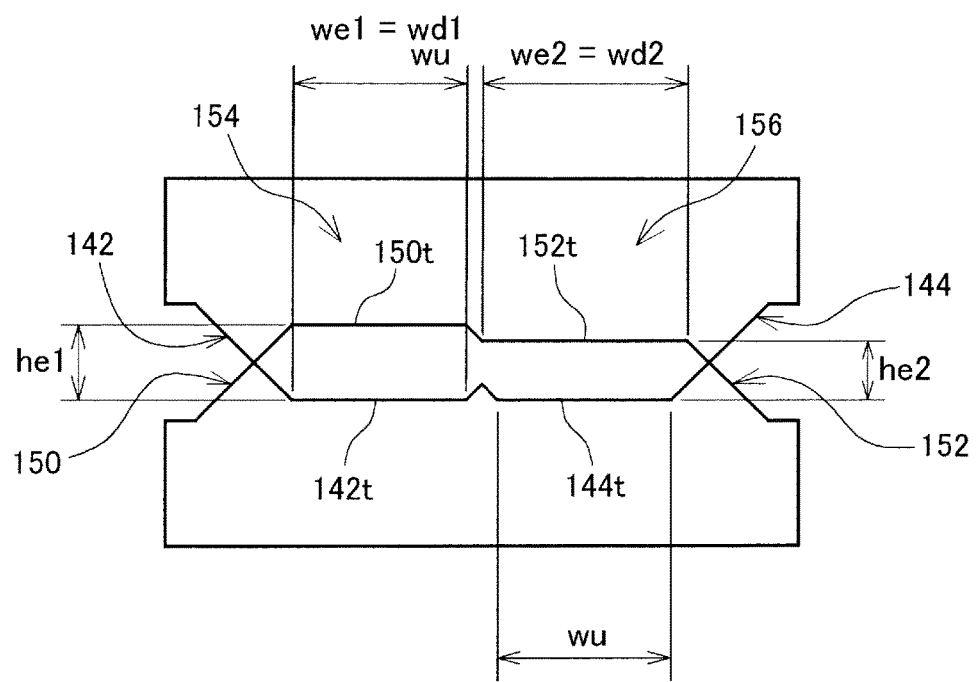
FIG. 6 illustrates another form of the shape of the lower tooth group.

FIG. 6 illustrates other forms of the first to fourth teeth rows 38, 40, 46, and 48. In the other forms, the high tooth row pair 54 and the low tooth row pair 56 are connected to each other in the tooth width direction. First upper teeth 142 and second upper teeth 144 have the same tooth height hu and the same tooth top width wu as those of the above-described first upper teeth 42 and the second upper teeth 44. The depth of valleys between tooth tops 142t and 144t of the first upper teeth 142 and the second upper teeth 144 is smaller than the tooth height hu. Lower high teeth 150 have the same tooth height hd1 and the same tooth top width wd1 as those of the above-described lower high teeth 50. Lower low teeth 152 have the same tooth height hd2 and the same tooth top width wd2 as those of the above-described lower low teeth 52. No valley is formed between the tooth tops 150t and 152t of the lower high teeth 150 and the lower low teeth 152. Only an inclined surface connecting the tooth tops 150t and 152t at different levels is formed. The effective tooth top width we1 of a high tooth row pair 154 is the tooth top width wd1 of the lower high teeth 150, and the effective tooth top width we2 of a low tooth row pair 156 is the tooth top width wd2 of the lower low teeth 152.

The engaging heights in the high tooth row pair 54 and the low tooth row pair 56 are each able to be set by both the tooth height of the upper teeth and the tooth height of the lower teeth. For example, the engaging height is set by using a tooth shape of a small tooth height and a large tooth top width also for the upper teeth in the low tooth row pair 56. In this case, for a fixed engaging height, the tooth height of the lower teeth increases compared to the case where the engaging height is set only with the lower teeth.

The tooth arrangement direction of the first tooth row 38 and the third tooth row 46 and the tooth arrangement direction of the second tooth row 40 and the fourth tooth row 48 are not necessarily the same but may intersect each other. The inclinations of the tooth side surfaces of the first upper teeth 42, the second upper teeth 44, the lower high teeth 50, and the lower low teeth 52, that is, the inclination angles θ1, θ2, θ3, and θ4 of the inclined sides of the isosceles trapezoidal shapes are, for example, 60° or larger. With the inclination angles θ1, θ2, θ3, and θ4 set to 60° or larger, breakage of the recording media caused by the end corners of the tooth tops may be suppressed. Furthermore, these inclination angles θ1, θ2, θ3, and θ4, may be equal to one another or different from one another, or two of these inclination angles θ1, θ2, θ3, and θ4 may be equal to each other. The shape of the teeth when seen in the tooth arrangement direction is not limited to the isosceles trapezoidal shape. The shape of the teeth when seen in the tooth arrangement direction may be, for example, any of usual trapezoidal shapes, a rectangular shape, or a shape having a trapezoidal shape on the tooth top side and a rectangular shape on the tooth bottom side.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording-medium binding device comprising:
    a first tooth group comprising:
        a first tooth row comprising a plurality of first teeth arranged in a first tooth arrangement direction; and
        a second tooth row comprising a plurality of second teeth arranged in a second tooth arrangement direction and which is disposed adjacent to the first tooth row in a tooth width direction; and
    a second tooth group comprising:
        a third tooth row comprising a plurality of third teeth arranged in a third tooth arrangement direction,
            wherein the third tooth row is configured to be engaged with the first tooth row, and
            wherein the third tooth row forms, together with the first tooth row, a first tooth row pair; and
        a fourth tooth row comprising a plurality of fourth teeth arranged in a fourth tooth arrangement direction,
            wherein the fourth tooth row is configured to be engaged with the second tooth row,
            wherein the fourth tooth row forms, together with the second tooth row, a second tooth row pair,
            wherein the fourth tooth row is configured to cooperate with the first tooth group so as to pinch recording media to bind the recording media,
    wherein, in the first tooth row pair, an engaging height, in a tooth height direction, is a first engaging height and a width, in a tooth width direction perpendicular to the first tooth arrangement direction, the second tooth arrangement direction and the tooth height direction, of an effective tooth top is a first effective tooth top width, and
    wherein, in the second tooth row pair, the engaging height, in the tooth height direction, is a second engaging height that is smaller than the first engaging height and a width, in the tooth width direction, of an effective tooth top is a second effective tooth top width that is larger than the first effective tooth top width.

2. The recording-medium binding device according to claim 1, wherein each of the plurality of first teeth has a top end portion, a tooth top, and a tooth bottom, and, when seen in the first tooth arrangement direction, at least the top end portion has a trapezoidal shape having a width increasing from a tooth top side toward a tooth bottom side,
    wherein each of the plurality of second teeth has a top end portion, a tooth top, and a tooth bottom, and, when seen in the second tooth arrangement direction, at least the top end portion has a trapezoidal shape having a width increasing from a tooth top side toward a tooth bottom side,
    wherein each of the plurality of third teeth has a top end portion, a tooth top, and a tooth bottom, and, when seen in the third tooth arrangement direction, at least the top end portion has a trapezoidal shape having a width increasing from a tooth top side toward a tooth bottom side, and
    wherein each of the plurality of fourth teeth has a top end portion, a tooth top, and a tooth bottom, and, when seen in the fourth tooth arrangement direction, at least the top end portion has a trapezoidal shape having a width increasing from a tooth top side toward a tooth bottom side.

3. The recording-medium binding device according to claim 2,
    wherein the trapezoidal shape of each of the plurality of first teeth, the plurality of second teeth, the plurality of third teeth, and the plurality of fourth teeth has an inclined side inclined at 60° or larger relative to a height direction.

4. The recording-medium binding device according to claim 1, wherein a number of the first teeth and a number of the second teeth are the same.

5. The recording-medium binding device according to claim 1, wherein a first height of the plurality of first teeth equals a second height of the plurality of second teeth.

6. The recording-medium binding device according to claim 1, wherein a second height of the plurality of second teeth equals a third height of the plurality of third teeth.

7. The recording-medium binding device according to claim 5, wherein a third height of the plurality of third teeth equals the second height.

8. The recording-medium binding device according to claim 1, wherein a first tooth top width of the plurality of first teeth equals a second tooth top width of the plurality of second teeth.

9. The recording-medium binding device according to claim 1, wherein a second tooth top width of the plurality of second teeth equals a third tooth top width of the plurality of third teeth.

10. The recording-medium binding device according to claim 8, wherein a third tooth top width of the plurality of third teeth equals the second tooth top width.

11. A recording-medium binding device comprising:
a first tooth group comprising:
   a first tooth row comprising a plurality of first teeth arranged in a first tooth arrangement direction; and
   a second tooth row comprising a plurality of second teeth arranged in a second tooth arrangement direction and which is disposed adjacent to the first tooth row in a tooth width direction; and
a second tooth group comprising:
   a third tooth row comprising a plurality of third teeth arranged in a third tooth arrangement direction,
     wherein the third tooth row is configured to be engaged with the first tooth row, and
     wherein the third tooth row forms, together with the first tooth row, a first tooth row pair; and
   a fourth tooth row comprising a plurality of fourth teeth arranged in a fourth tooth arrangement direction,
     wherein the fourth tooth row is configured to be engaged with the second tooth row,
     wherein the fourth tooth row forms, together with the second tooth row, a second tooth row pair,
     wherein the fourth tooth row is configured to cooperate with the first tooth group so as to pinch recording media to bind the recording media,
wherein, in the first tooth row pair, an engaging height is a first engaging height and a width of an effective tooth top is a first effective tooth top width,
wherein, in the second tooth row pair, the engaging height is a second engaging height that is smaller than the first engaging height and a width of an effective tooth top is a second effective tooth top width that is larger than the first effective tooth top width, and
wherein a first height of the plurality of first teeth equals a second height of the plurality of second teeth.

12. A recording-medium binding device comprising:
a first tooth group comprising:
   a first tooth row comprising a plurality of first teeth arranged in a first tooth arrangement direction; and
   a second tooth row comprising a plurality of second teeth arranged in a second tooth arrangement direction and which is disposed adjacent to the first tooth row in a tooth width direction; and
a second tooth group comprising:
   a third tooth row comprising a plurality of third teeth arranged in a third tooth arrangement direction,
     wherein the third tooth row is configured to be engaged with the first tooth row, and
     wherein the third tooth row forms, together with the first tooth row, a first tooth row pair; and
   a fourth tooth row comprising a plurality of fourth teeth arranged in a fourth tooth arrangement direction,
     wherein the fourth tooth row is configured to be engaged with the second tooth row,
     wherein the fourth tooth row forms, together with the second tooth row, a second tooth row pair,
     wherein the fourth tooth row is configured to cooperate with the first tooth group so as to pinch recording media to bind the recording media,
wherein, in the first tooth row pair, an engaging height is a first engaging height and a width of an effective tooth top is a first effective tooth top width,
wherein, in the second tooth row pair, the engaging height is a second engaging height that is smaller than the first engaging height and a width of an effective tooth top is a second effective tooth top width that is larger than the first effective tooth top width, and
wherein a first tooth top width of the plurality of first teeth equals a second tooth top width of the plurality of second teeth.

* * * * *